(12) United States Patent
Cindrich

(10) Patent No.: US 11,539,197 B2
(45) Date of Patent: Dec. 27, 2022

(54) REMOTE DEVICE MOUNT

(71) Applicant: DATA:)COMM ELECTRONICS, INC., Norcross, GA (US)

(72) Inventor: Daniel Cindrich, Fairfax, CA (US)

(73) Assignee: DATA:)COMM ELECTRONICS, INC., Norcross, GA (US)

( * ) Notice: Subject to any disclaimer, the term of this patent is extended or adjusted under 35 U.S.C. 154(b) by 202 days.

(21) Appl. No.: 17/118,712

(22) Filed: Dec. 11, 2020

(65) Prior Publication Data
US 2022/0190573 A1  Jun. 16, 2022

(51) Int. Cl.
*H02G 3/14*  (2006.01)
*H02G 3/12*  (2006.01)

(52) U.S. Cl.
CPC ............... *H02G 3/121* (2013.01); *H02G 3/14* (2013.01)

(58) Field of Classification Search
CPC ........... H02G 3/121; H02G 3/14; H02G 3/10; H02G 3/12; H02G 3/123; H02G 3/126; H05K 5/03; H05K 13/04
USPC ................. 174/66, 67, 480, 481, 50, 53, 57; 220/241, 242, 3.2–3.9, 4.02; 33/DIG. 10, 33/528; 52/220.1, 220.8
See application file for complete search history.

(56) References Cited

U.S. PATENT DOCUMENTS

| | | | |
|---|---|---|---|
| 3,840,692 A | 10/1974 | Wells | |
| 4,673,235 A | 6/1987 | Conley | |
| 4,803,380 A | 2/1989 | Jacoby, Jr. et al. | |
| 5,902,960 A * | 5/1999 | Smith | H02G 3/12 174/66 |
| 6,538,202 B1 * | 3/2003 | Shaffer | H02G 3/14 174/67 |
| 6,956,169 B1 | 10/2005 | Shotey | |
| 7,186,917 B1 * | 3/2007 | Van De Wiele, Jr. | H02G 3/12 174/67 |
| 7,265,291 B1 * | 9/2007 | Gorman | H02G 3/14 174/66 |
| 8,119,911 B1 * | 2/2012 | Waller | H02G 3/14 174/67 |
| 8,610,004 B2 * | 12/2013 | Solan | H02G 3/14 174/58 |
| 2010/0101854 A1 | 4/2010 | Wallaert et al. | |

* cited by examiner

*Primary Examiner* — Angel R Estrada

(74) *Attorney, Agent, or Firm* — Thomas | Horstemeyer, LLP

(57) ABSTRACT

Embodiments of a remote device mount (RDM) for installing a sensor in drywall and kit for the same are disclosed. The kit includes a mud cap, a paint shield, and a mounting plate. The mounting plate is secured to a framing structure. The plate has a sensor mounting hole extending completely through the plate and an annular sensor recess surrounding the hole. The mud cap is temporarily installed in a sensor recess in the plate to substantially cover the sensor recess and the hole. Drywall mud is applied over the plate and mud cap. The mud cap is removed. The paint shield is temporarily installed in the hole to substantially cover the sensor mounting hole. Paint is applied over the plate and the paint shield. The paint shield is removed in order to uncover the sensor mounting hole. Finally, the sensor permanently installed in the sensor recess and the sensor mounting hole.

19 Claims, 10 Drawing Sheets

REMOTE DEVICE MOUNT

TECHNICAL FIELD

Various embodiments of the present invention relate to low-voltage sensor mounting plates, flush and surface mounts, faceplates, cable attachment points, and apparatus devices systems and kits therefor.

BACKGROUND

Low-voltage temperature sensors, glass break sensors, motion detectors, and other small measurement devices (collectively referred to herein as "sensors") are intended to be mounted in a small hole, typically drilled, in a wall surface. Cabling to these sensors is run through the walls and typically fastened to a plastic strap or nail. In order to connect the cable and install the device, a hole must be drilled where the cable is fastened to the wall. This presents a challenge of drilling a hole while not damaging the cable or losing it in the wall cavity.

After a hole is drilled in the wall, the device is meant to be surface mounted so that it stands proud of the wall. Oftentimes, aesthetics require sensors to be flush mounted. This requires the low voltage contractor to manually drill a recess for the sensor which most commonly gets mudded or plastered over, reducing the accuracy of the sensor. Most "puck style" remote temperature sensors require air flow behind the puck in order to give an accurate reading.

If the hole isn't made perfectly (oversized, chipped plaster, off center, etc.), then the wall construction team must be brought back to patch and refinish the hole so it is the correct size.

The inventor has determined that, what is needed is a mounting platform, designed to be fastened to the framework and mudded or plastered into the wall surface, which has an appropriately sized mounting hole and recess for the sensor, as well as mounting points to secure cables inside the wall cavity within reach of the mounting hole.

SUMMARY OF THE INVENTION

Embodiments of a remote device mount (RDM) for installing a sensor in drywall, method associated with same, and a kit for the same are disclosed.

One embodiment, among others, is an RDM kit that includes a mud cap, a paint shield, and a mounting plate. In other embodiments, the RDM kit could include the foregoing devices and additionally plate fasteners (e.g., mounting screws) and/or a sensor.

Another embodiment, among others, is a method for installing an RDM and sensor, which includes the following steps. A mounting plate is secured to a framing structure. The mounting plate has a sensor mounting hole extending completely through the plate and an annular sensor recess surrounding the hole. The mud cap is temporarily installed in a sensor recess in the plate to substantially cover the sensor recess and the hole. Drywall mud is applied over the plate and mud cap. The mud cap is removed. The paint shield is temporarily installed in the hole to substantially cover the sensor mounting hole. Paint is applied over the plate and the paint shield. The paint shield is removed in order to uncover the sensor mounting hole. Finally, the sensor permanently installed in the sensor recess and the sensor mounting hole.

In this embodiment, the mounting plate is generally planar with interior and exterior sides and a surrounding rectangular periphery edge. The exterior side receives drywall mud. The interior side is mounted against a framing structure. The mounting plate has a sensor recess in a central region. The central region has a sensor mounting hole extending through the mounting plate between the sensor recess and the interior side of the mounting plate. The sensor recess is designed to receive the mud cap so that the mud cap covers the sensor recess and the sensor mounting hole and so that the mud cap is generally coplanar with the surrounding exterior side of the plate. The sensor mounting hole is designed to receive the paint shield so that the paint shield covers the sensor mounting hole and so that the paint shield is generally coplanar with a surrounding surface of the sensor recess. The sensor recess and the sensor mounting hole in combination are designed to receive a sensor.

In this embodiment, the mud cap is generally planar with interior and exterior sides and a circular periphery edge. The mud cap has a plurality of removable break out plugs extending through the mud cap between the interior and exterior sides. The plugs are designed to be removed in order to enable removal of the mud cap from the sensor recess. The mud cap also includes a plurality of locking tabs that extend outwardly from the interior side. Each of the alignment grooves of the sensor mounting hole is designed to receive a respective locking tab of the mud cap when the mud cap is installed.

In this embodiment, the paint shield is generally planar with interior and exterior sides and a circular periphery edge. The paint shield has removable break out plugs extending through the paint shield between the interior and exterior sides. The plugs are designed to be removed in order to enable removal of the paint shield from the sensor mounting hole. The paint shield has a plurality of alignment tabs extending outwardly from the periphery. Each of the alignment grooves of the sensor mounting hole is designed to receive a respective alignment tab of the paint shield when the paint shield is installed.

Finally, in this embodiment, the sensor comprises an elongated generally cylindrical body with interior and exterior ends. The exterior end has a circular sensing region. The interior end has an interface, such as wires or ports, for connecting cables to the sensor. The body has a plurality of outwardly extending alignment tabs. Each of the alignment grooves of the sensor mounting hole is designed to receive a respective alignment tab of the sensor when the sensor is installed.

Other embodiments, apparatus, methods, features, and advantages of the present invention will be apparent to one with skill in the art upon examination of the following drawings and detailed description. It is intended that all such additional embodiments, apparatus, methods, features, and advantages be included within this disclosure, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
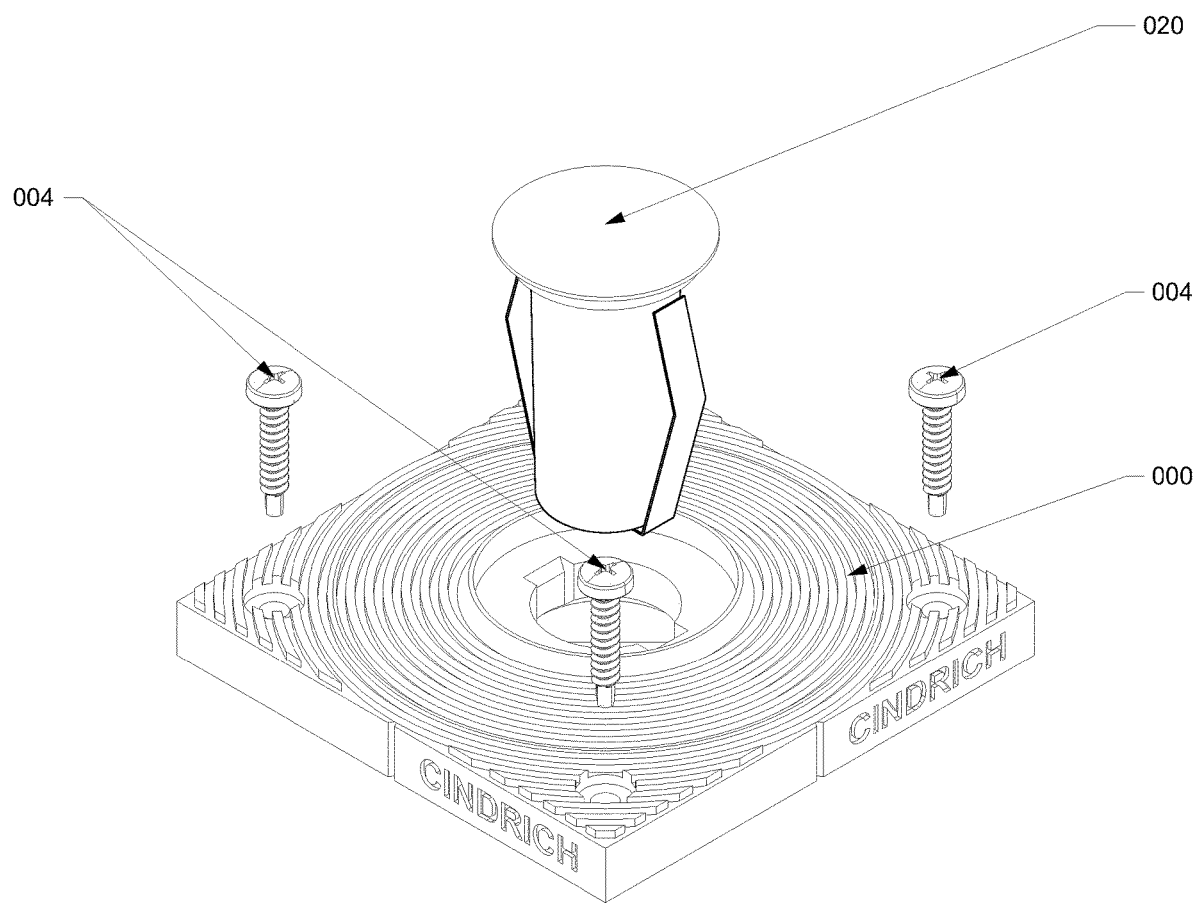
FIG. 1 is an unassembled top perspective view of a mounting plate with sensor associated with a remote device mount (RDM) of the present invention.

Embodiments of a remote device mount (RDM) for installing a sensor 020 in drywall, a method associated with same, and a kit that can be offered for sale for the same are disclosed.

The kit includes at least a mounting plate 000, a mud cap 013, and a paint shield 016. Optionally, a plurality of plate fasteners 004 and/or a sensor 020 may also be provided in the kit. The kit provides a very refined, finished sensor mounting hole 006, either recessed in or flush with a wall surface.

Figure 2:
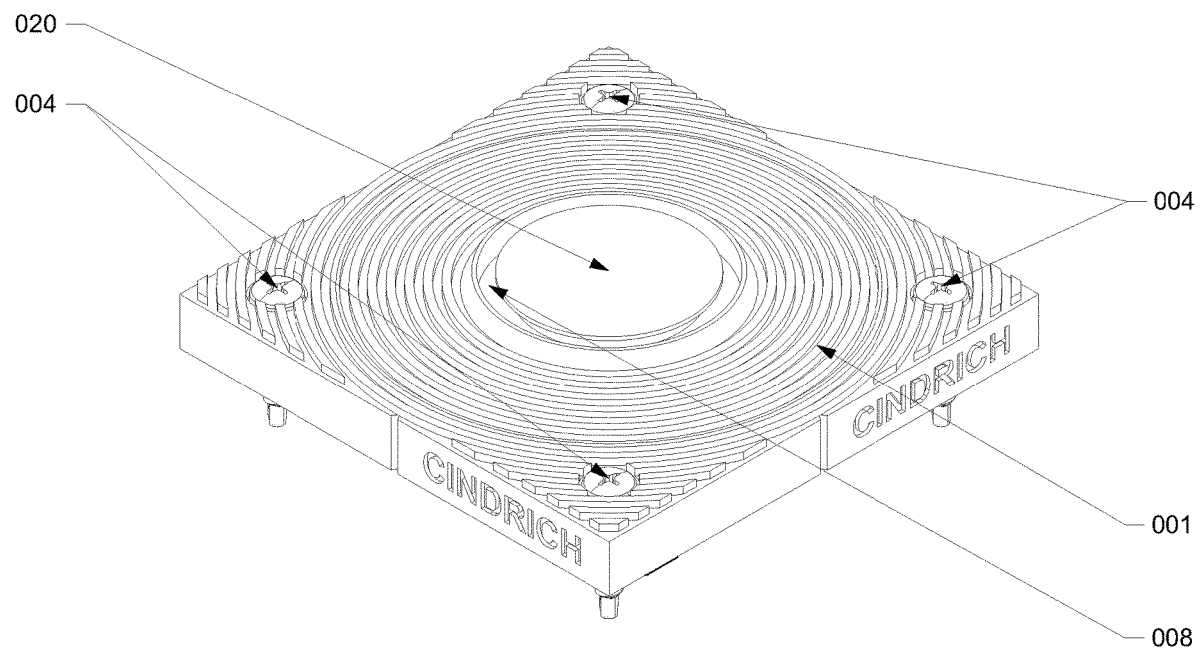
FIG. 2 is an assembled top perspective view of the RDM with sensor of FIG. 1.

FIG. 1 shows an unassembled top perspective view of the mounting plate 000 with sensor 020 associated with the RDM of the present invention. FIG. 2 shows an assembled top perspective view of the RDM with sensor 020 of FIG. 1. The sensor 020 has an elongated body with interior and exterior ends. The exterior end has a sensing region, which is shown as having a flat circular area. In some embodiments, the diameter of the sensing region may be smaller than the surrounding recess 009 so that there is an air gap 008 between them. This may be important for correct operation of the sensor 020. The interior end has an electrical interface, such as wires or ports, for connecting cables to the sensor 020. The body of the sensor 020 has a plurality of outwardly extending alignment tabs. Each of the alignment grooves 007 of the sensor mounting hole 006 is designed to receive a respective alignment tab of the sensor 020 when the sensor 020 is installed.

Figure 3:
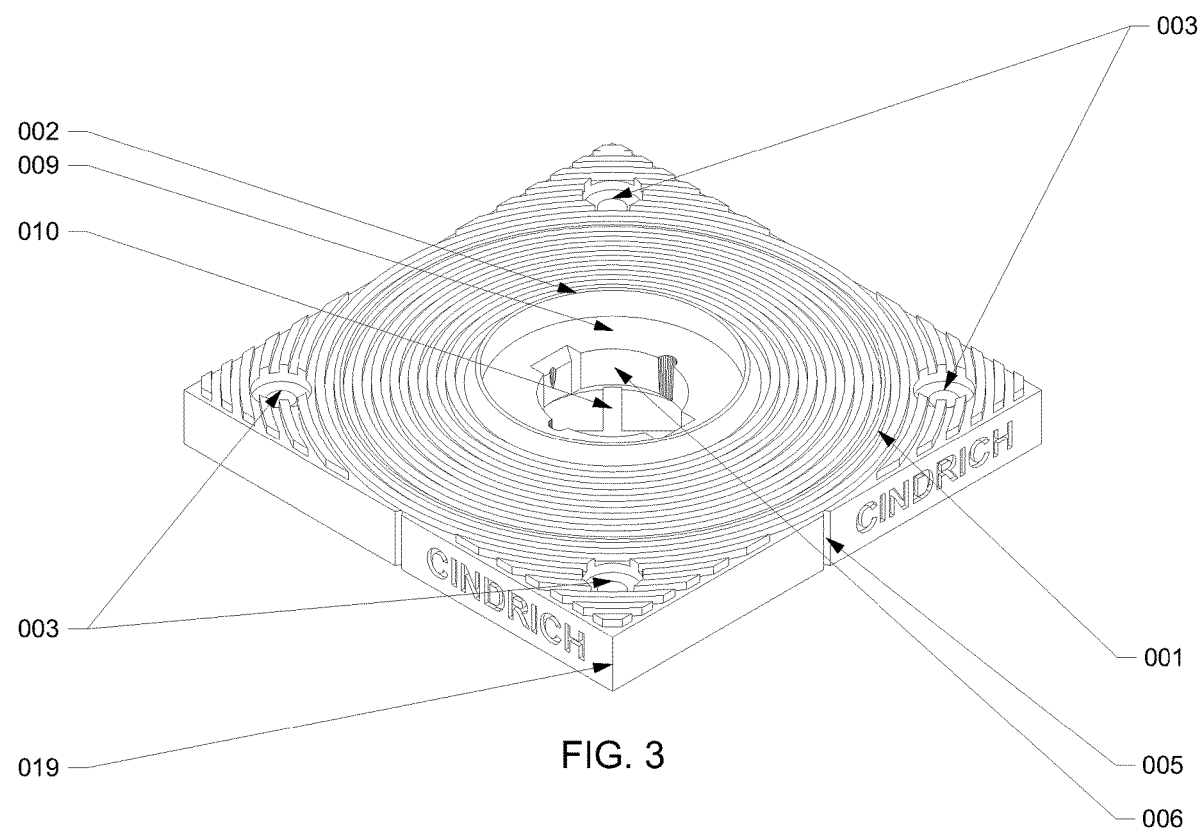
FIG. 3 is a top perspective view of the mounting plate of the RDM of FIGS. 1 and 2.
Figure 4:
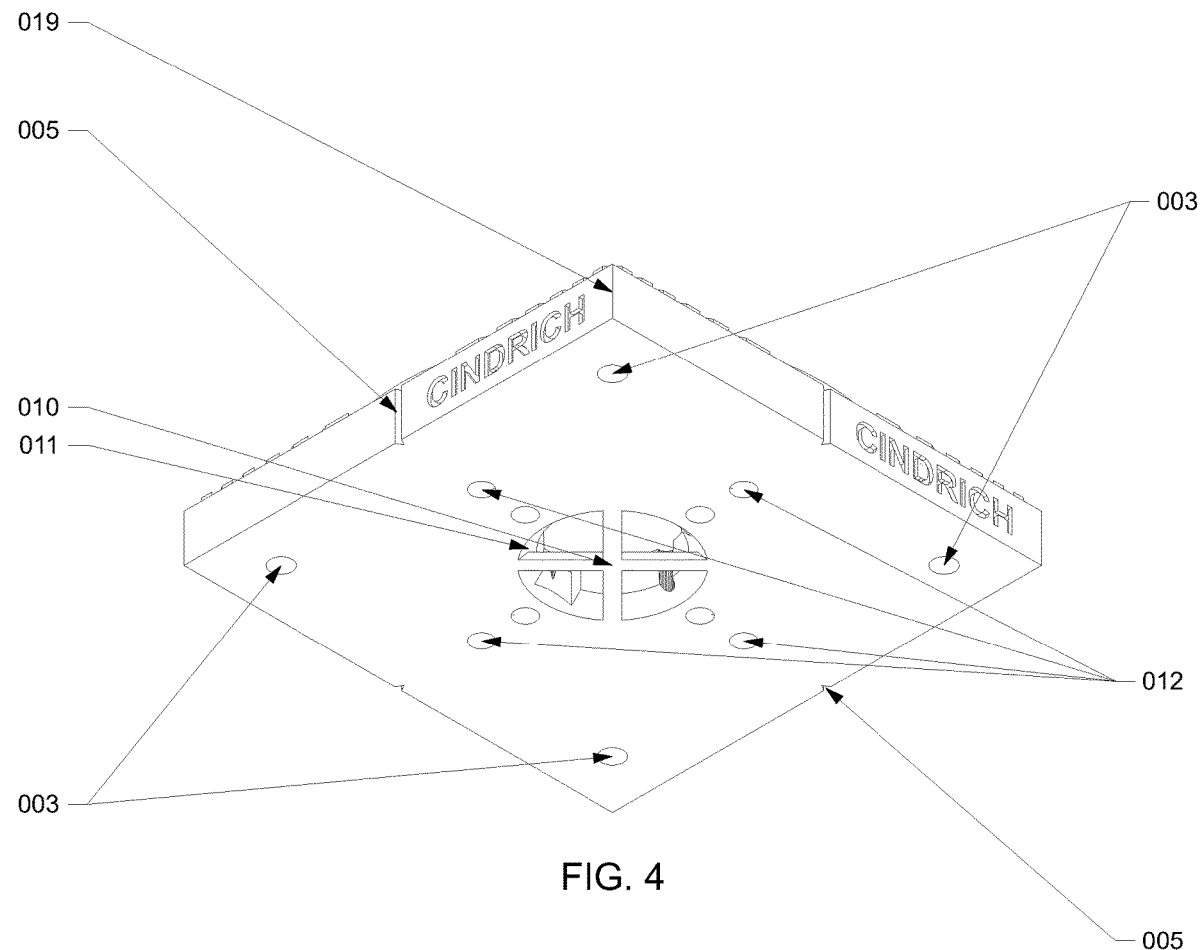
FIG. 4 is a bottom perspective view of the mounting plate of FIG. 3.

FIG. 3 is a top perspective view of the mounting plate 000 of the RDM of FIGS. 1 and 2. The mounting plate 000 is generally planar and has interior and exterior sides, a surrounding periphery edge, and variable thickness 019. The exterior side is designed for receiving drywall mud. The interior side is designed for mounting against the framing structure. The mounting plate 000 has a sensor mounting hole 006 in a central region extending through the mounting plate 000. The mounting plate 000 has an annular sensor recess 009 surrounding the sensor mounting hole 006. The sensor recess is designed to receive the mud cap 013 when a sensor 020 and paint shield 016 are uninstalled. The sensor mounting hole 006 is designed to receive the paint shield 016 when the mud cap 013 is uninstalled and is designed to receive the sensor 020 when the mud cap 013 and the paint shield 016 are uninstalled. In some embodiments, the mounting plate 000 can include a plurality of alignment grooves 005 along the surrounding periphery edge, as shown in FIG. 3. Each of the grooves 005 extends between the exterior side and the interior side of the mounting plate 000.

In terms of composition, the mounting plate 000 is preferably a light weight plastic material, but other suitable materials are possible, including but not limited to, metal. Furthermore, in the preferred embodiment, the mounting plate 000 has grooves at the top surface and is tapered from a central region to the surrounding periphery edge. The grooves enable easy application of drywall mud, and the taper allows for sheet rock tape to be placed around the periphery edge prior to application of the drywall mud.

The sensor mounting hole 006 of the mounting plate 000 comprises a plurality of sensor alignment grooves 007 designed to guide the sensor 020, the mud cap 013, and the paint shield 016 in a particular orientation during installment of each.

The mud cap 013 is generally planar with interior and exterior sides and a circular periphery. The mud cap 013 has a plurality of removable break out plugs extending through the mud cap 013 between the interior and exterior sides. The plugs are designed to be removed in order to enable removal of the mud cap 013 from the sensor recess 009. The mud cap 013 has a plurality of locking tabs 015 that extend outwardly from the interior side. Each of the alignment grooves 007 of the sensor mounting hole 006 is designed to receive a respective locking tab 015 of the mud cap 013 when the mud cap 013 is installed.

The paint shield 016 is generally planar with interior and exterior sides and a circular periphery. The paint shield 016 has a plurality of removable break out plugs 017 extending through the paint shield 016 between the interior and exterior sides. The plugs 017 are designed to be removed in order to enable removal of the paint shield 016 from the sensor mounting hole 006. The paint shield has a plurality of alignment tabs 018 extending outwardly from the periphery. Each of the alignment grooves 007 of the sensor mounting hole 006 is designed to receive a respective alignment tab 018 of the paint shield 016 when the paint shield 016 is installed.

The interior side of the mounting plate 000 has means for attaching cables (i.e., a group of wires in a jacket) to the mounting plate 000. The attaching means includes a removable break out cable attachment cross 010 with break out cable attachment cross taper 011 in the sensor mounting hole 006 at substantially the interior side of the mounting plate 000. Moreover, the attaching means includes a plurality of cable attachment channels in the mounting plate 000 with a respective pair of holes 006 designed to receive a cable tie for attaching cables to the interior side of the mounting plate 000.

In practice, the mounting plate 000 is fastened to the framing structure by plate fasteners 004 which pass through recessed attachment holes 003. The plate fasteners 004 can be any suitable screws. Self-drilling metal screws are shown as a nonlimiting example. Wood screws or nails are other possible options. The framing structure may include wood or metal elements. During this process, the cable intended to be connected to the sensor 020 is fastened to the cable attachment points 012 on the rear of the mounting plate 000, and a break out cable attachment cross 010 using standard cable ties.

Figure 5:
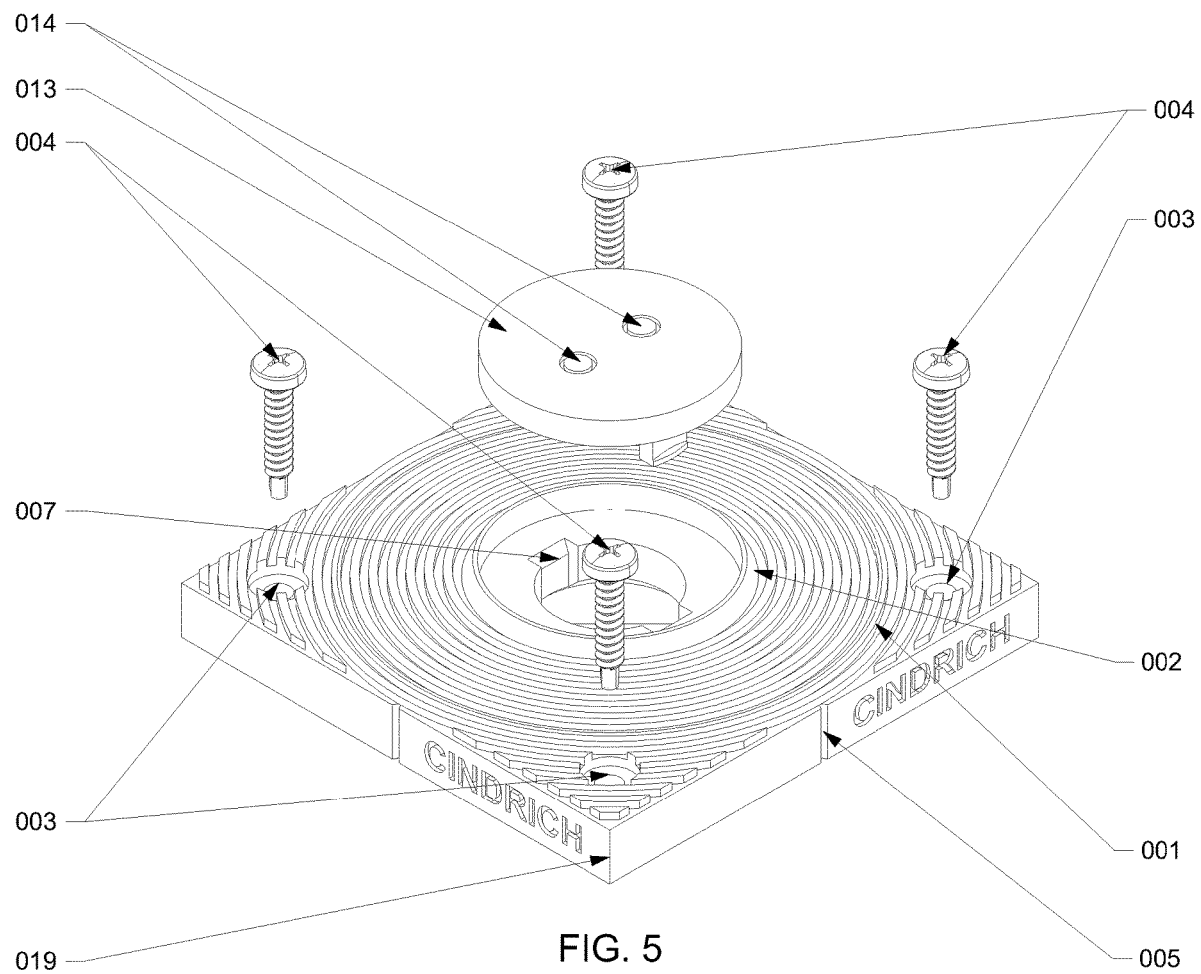
FIG. 5 is an unassembled top perspective view of the RDM having the mounting plate with mud cap.
Figure 6:
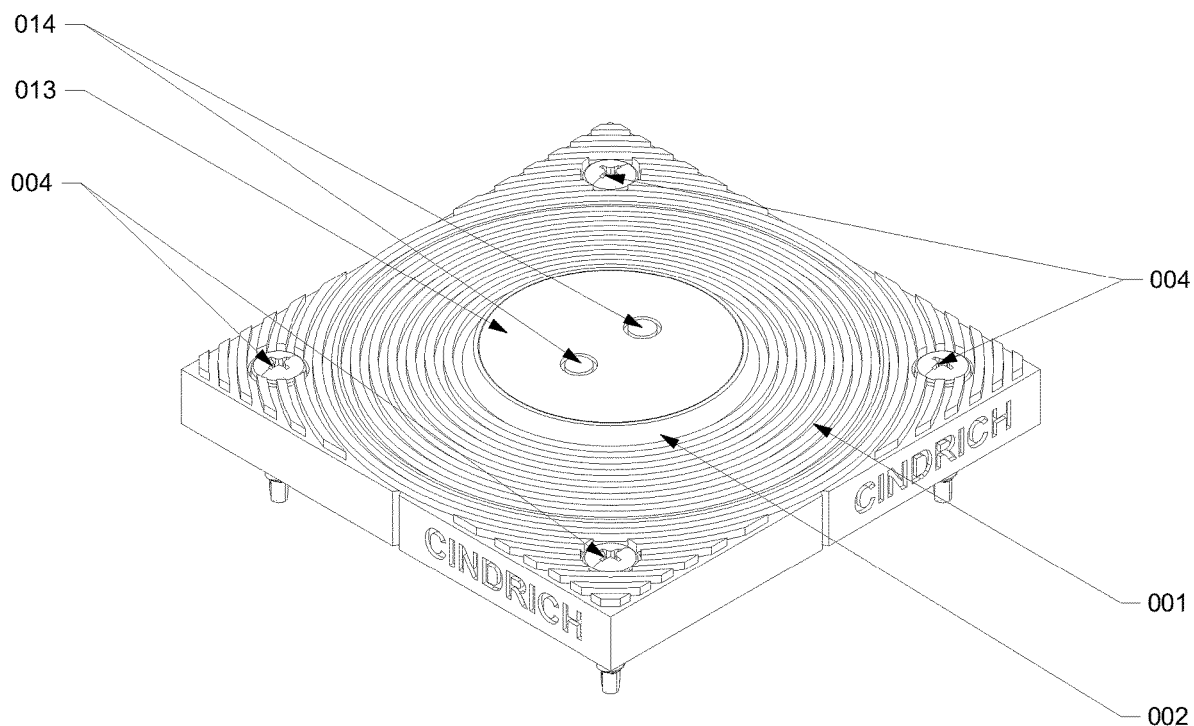
FIG. 6 is an assembled top perspective view of the RDM of FIG. 5 having the mounting plate with mud cap.
Figure 7:
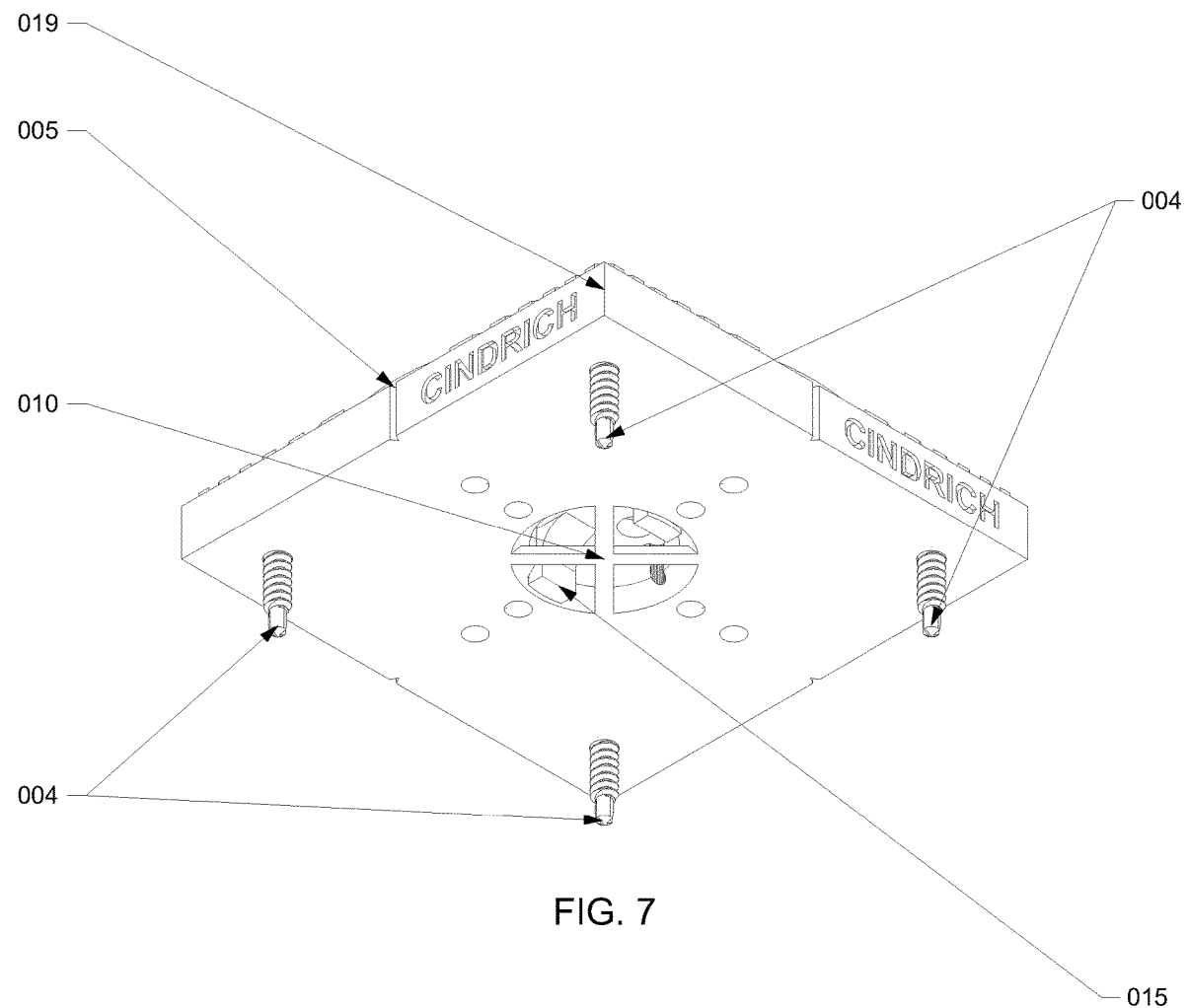
FIG. 7 is a bottom perspective view of the RDM of FIG. 6 having the mounting plate with mud cap.

Next, the mud cap 013 is installed, as shown in FIGS. 5 through 7, prior to finishing of the wall surface. Drywall mud or some other leveling compound is applied directly to the tapered mud plane 001, covering the mud cap 013, prior to the process of finish sanding. After the wall surface is finished and sanded flush with the mud dam 002, the mud cap 013 is removed, preferably with a pair of needle nose pliers by way of the mud cap break out plugs 014.

Figure 8:
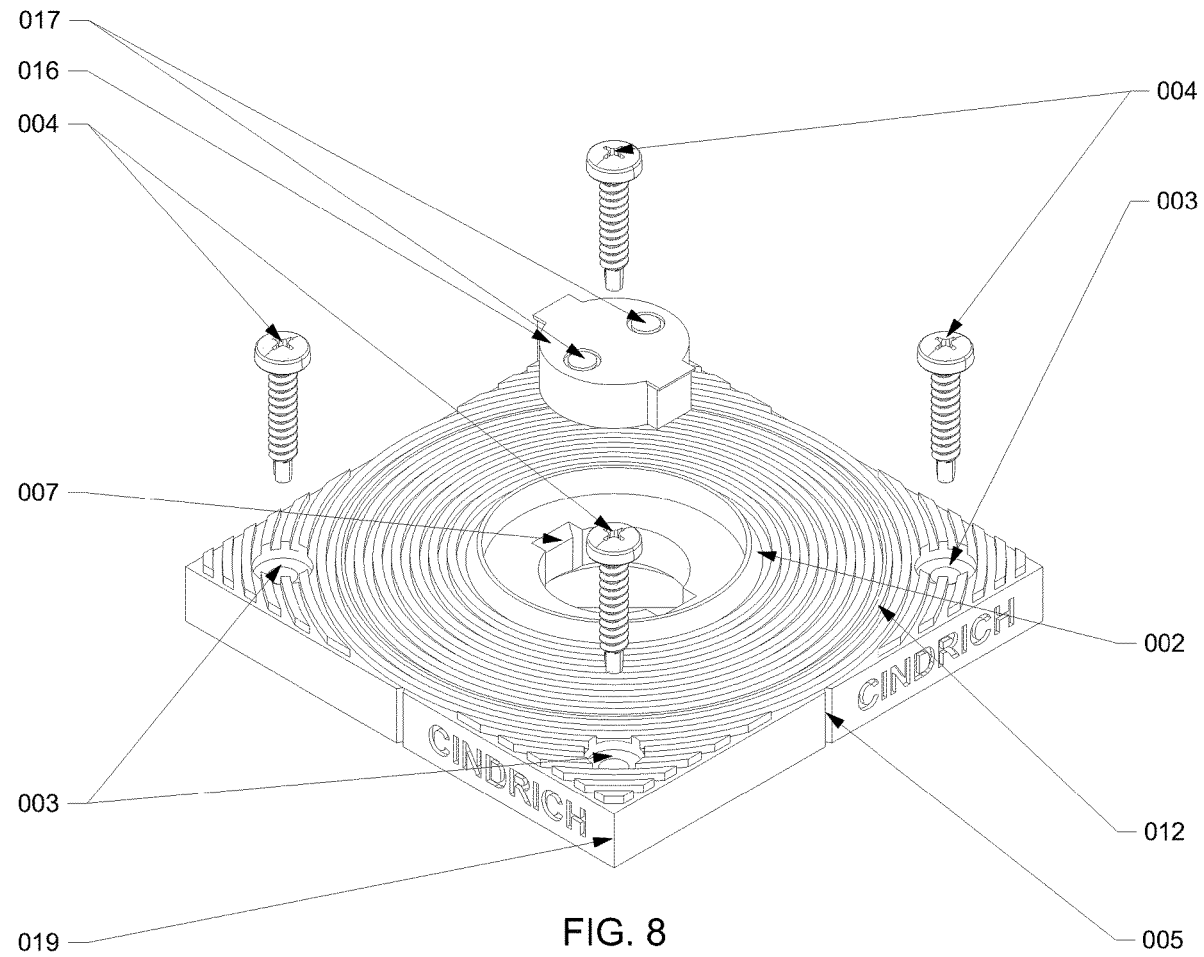
FIG. 8 is an unassembled top perspective view of the RDM having the mounting plate with paint shield.
Figure 9:
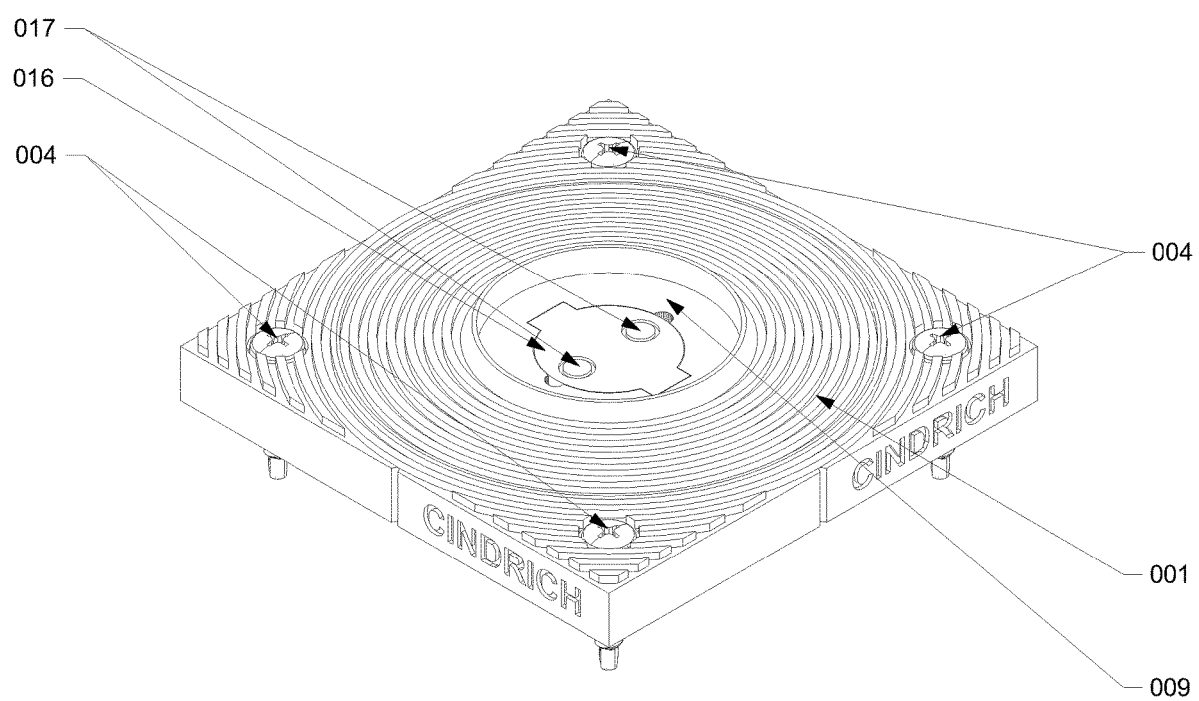
FIG. 9 is an assembled top perspective view of the RDM of FIG. 8 having the mounting plate with paint shield.
Figure 10:
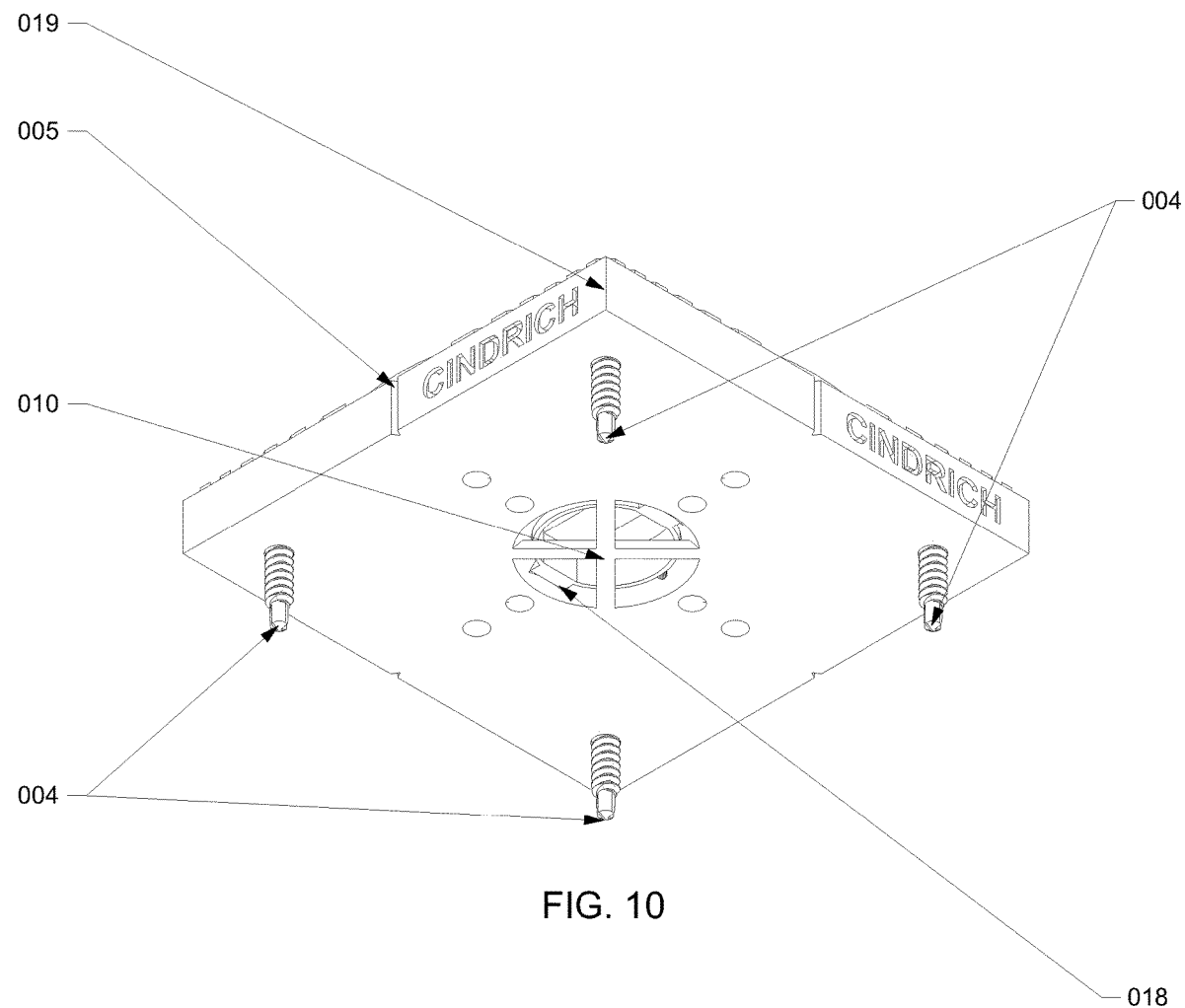
FIG. 10 is a bottom perspective view of the RDM of FIG. 9 having the mounting plate with paint shield.

As shown in FIGS. 8 through 10, the paint shield 016 is installed. After the wall and sensor recess 009 have been painted, the paint shield 016 is removed, preferably with a pair of needle nose pliers by way of the paint shield break out plugs 017.

In order to connect and install the sensor 020, the cable is pulled through the sensor mounting hole 006 after cutting the break out cable attachment cross 010, preferably with a pair of flush cut pliers. This method insures that the sensor mounting hole in the wall surface is finished to an exacting specification for virtually any type or brand of in-wall sensor and insures that the cable is easily accessible in the wall cavity. It also provides a flush aesthetic appearance for sensors 020 that would normally protrude from the wall surface.

Also contemplated as an alternate embodiment is mass-producible version of the RDM. In this alternative embodiment, the recess for the sensor is made larger than the largest sensor that could be used with it and one or more inserts are provided that snaps into the recess of the mounting plate 000. This insert has the sensor mounting hole in it that is the appropriate size for the sensor 020 being mounted.

Finally, it should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

Parts List:
000 Mounting Plate
001 Tapered Mud Plane
002 Mud Dam
003 Attachment Holes
004 Mounting Plate Fasteners
005 Mounting Plate Alignment Grooves
006 Sensor Mounting Hole
007 Sensor Alignment Grooves
008 Optional Air Gap
009 Sensor Recess
010 Break Out Cable Attachment Cross
011 Break Out Cable Attachment Cross Taper
012 Cable Attachment points
013 Mud Cap
014 Mud Cap break out plugs
015 Mud Cap Locking Tabs
016 Paint Shield
017 Paint Shield break out plugs
018 Paint Shield Alignment Tabs
019 Variable Thickness
020 Sensor At least the following is claimed:

1. A remote device mount kit, comprising:
a mud cap;
a paint shield; and
a generally planar mounting plate having interior and exterior sides and a surrounding periphery edge, the exterior side for receiving drywall mud, the interior side for mounting against a framing structure, the mounting plate having a sensor mounting hole in a central region extending through the mounting plate, the mounting plate having an annular sensor recess surrounding the hole, the sensor recess designed to receive the mud cap when a sensor and paint shield are uninstalled, the sensor mounting hole designed to receive the paint shield when the mud cap is uninstalled, the sensor mounting hole designed to receive the sensor when the mud cap and the paint shield are uninstalled.

2. The kit of claim 1, wherein the mounting plate comprises a plurality of attachment holes for receiving plate fasteners for attaching the mounting plate to the framing structure.

3. The kit of claim 1, wherein the sensor mounting hole of the mounting plate comprises a plurality of sensor alignment grooves designed to guide the sensor, the mud shield, and the paint shield in a particular orientation during installment.

4. The kit of claim 3, wherein the mud cap is generally planar with interior and exterior sides and a circular periphery, the mud cap comprising removable break out plugs extending through the mud cap between the interior and exterior sides, the plugs designed to be removed in order to enable removal of the mud cap from the sensor recess, the mud cap further comprising a plurality of locking tabs that extend outwardly from the interior side, each of the alignment grooves of the sensor mounting hole designed to receive a respective locking tab of the mud cap when the mud cap is installed.

5. The kit of claim 3, wherein the paint shield is generally planar with interior and exterior sides and a circular periphery, the paint shield comprising removable break out plugs extending through the paint shield between the interior and exterior sides, the plugs designed to be removed in order to enable removal of the paint shield from the sensor mounting hole, the paint shield further comprising a plurality of alignment tabs extending outwardly from the periphery, each of the alignment grooves of the sensor mounting hole designed to receive a respective alignment tab of the paint shield when the paint shield is installed.

6. The kit of claim 3, further comprising a sensor and wherein the sensor comprises and elongated body with interior and exterior ends, the exterior end having a sensing region, the interior end having an electrical interface for connecting cables to the sensor.

7. The kit of claim 6, wherein the body comprises a plurality of outwardly extending alignment tabs, each of the alignment grooves of the sensor mounting hole designed to receive a respective alignment tab of the sensor when the sensor is installed.

8. The kit of claim 1, wherein the interior side of the mounting plate comprises means for attaching cables to the mounting plate.

9. The kit of claim 8, wherein the attaching means comprises a removable break out cable attachment cross in the sensor mounting hole at substantially the interior side of the mounting plate.

10. The kit of claim 8, wherein the attaching means comprises cable attachment channels in the plate with a respective pair of holes designed to receive a cable tie for attaching cables to the interior side of the plate.

11. The kit of claim 1, wherein the exterior side of the mounting plate has grooves for receiving the drywall mud.

12. The kit of claim 1, wherein the exterior side of the mounting plate is tapered from a central region to the surrounding periphery edge.

13. The kit of claim 1, wherein the mounting plate comprises a plurality of alignment grooves along the surrounding periphery edge, each of the grooves extending between the exterior side and the interior side.

14. A remote device mount kit, comprising:

a mud cap, a paint shield, and a mounting plate;

wherein the mounting plate is generally planar with interior and exterior sides and a surrounding rectangular periphery edge, the exterior side for receiving drywall mud, the interior side for mounting against a framing structure, the mounting plate having a sensor recess in a central region, the central region having a sensor mounting hole extending through the mounting plate between the sensor recess and the interior side of the mounting plate, the sensor recess designed to receive the mud cap so that the mud cap covers the sensor recess and the sensor mounting hole and so that the mud cap is generally coplanar with the surrounding exterior side of the plate, the sensor mounting hole designed to receive the paint shield so that the paint shield covers the sensor mounting hole and so that the paint shield is generally coplanar with a surrounding surface of the sensor recess, the sensor recess and the sensor mounting hole in combination designed to receive a sensor;

wherein the mud cap is generally planar with interior and exterior sides and a circular periphery edge, the mud cap comprising removable break out plugs extending through the mud cap between the interior and exterior sides, the plugs designed to be removed in order to enable removal of the mud cap from the sensor recess, the mud cap further comprising a plurality of locking tabs that extend outwardly from the interior side, each of the alignment grooves of the sensor mounting hole designed to receive a respective locking tab of the mud cap when the mud cap is installed;

wherein the paint shield is generally planar with interior and exterior sides and a circular periphery edge, the paint shield comprising removable break out plugs extending through the paint shield between the interior and exterior sides, the plugs designed to be removed in order to enable removal of the paint shield from the sensor mounting hole, the paint shield further comprising a plurality of alignment tabs extending outwardly from the periphery, each of the alignment grooves of the sensor mounting hole designed to receive a respective alignment tab of the paint shield when the paint shield is installed; and wherein the sensor comprises an elongated generally cylindrical body with interior and exterior ends, the exterior end having a circular sensing region, the interior end having an electrical interface for connecting cables to the sensor, the body comprising a plurality of outwardly extending alignment tabs, each of the alignment grooves of the sensor mounting hole designed to receive a respective alignment tab of the sensor when the sensor is installed.

15. A method for installing a sensor in drywall, comprising the steps of:

attaching a generally planar mounting plate to a framing structure, the mounting plate having interior and exterior sides, the exterior side for receiving drywall mud, the interior side for mounting against the framing structure, the mounting plate having a sensor recess in a central region, the central region having a hole extending through the mounting plate between the sensor recess and the interior side of the mounting plate;

installing a mud cap in the sensor recess to substantially cover the sensor recess and the hole;

applying drywall mud over the exterior surface of the mounting plate and mud cap;

removing the mud cap in order to uncover the sensor recess and the sensor mounting hole;

installing the paint shield in the hole to substantially cover the sensor mounting hole;

applying paint over the exterior surface of the mounting plate and the paint shield;

removing the paint shield in order to uncover the sensor mounting hole; and installing the sensor in the sensor recess and the sensor mounting hole.

16. The method of claim 15, wherein:

the mounting plate is generally planar with interior and exterior sides and a surrounding rectangular periphery edge, the exterior side for receiving drywall mud, the interior side for mounting against a framing structure, the mounting plate having a sensor recess in a central region, the central region having a sensor mounting hole extending through the mounting plate between the sensor recess and the interior side of the mounting plate, the sensor recess designed to receive the mud cap so that the mud cap covers the sensor recess and the sensor mounting hole and so that the mud cap is generally coplanar with the surrounding exterior side of the plate, the sensor mounting hole designed to receive the paint shield so that the paint shield covers the sensor mounting hole and so that the paint shield is generally coplanar with a surrounding surface of the sensor recess, the sensor recess and the sensor mounting hole in combination designed to receive a sensor;

the mud cap is generally planar with interior and exterior sides and a circular periphery edge, the mud cap comprising removable break out plugs extending through the mud cap between the interior and exterior sides, the plugs designed to be removed in order to enable removal of the mud cap from the sensor recess, the mud cap further comprising a plurality of locking tabs that extend outwardly from the interior side, each of the alignment grooves of the sensor mounting hole designed to receive a respective locking tab of the mud cap when the mud cap is installed;

the paint shield is generally planar with interior and exterior sides and a circular periphery edge, the paint shield comprising removable break out plugs extending through the paint shield between the interior and exterior sides, the plugs designed to be removed in order to enable removal of the paint shield from the sensor mounting hole, the paint shield further comprising a plurality of alignment tabs extending outwardly from the periphery, each of the alignment grooves of the sensor mounting hole designed to receive a respective alignment tab of the paint shield when the paint shield is installed; and the sensor comprises an elongated generally cylindrical body with interior and exterior ends, the exterior end having a circular sensing region, the interior end having an electrical interface for connecting cables to the sensor, the body comprising a plurality of outwardly extending alignment tabs, each of the alignment grooves of the sensor mounting hole designed to receive a respective alignment tab of the sensor when the sensor is installed.

17. The method of claim 16, wherein the interior side of the mounting plate comprises means for attaching cables to the mounting plate.

18. The method of claim 16, wherein the exterior side of the mounting plate has grooves for receiving the drywall mud.

19. The method of claim 16, wherein the exterior side of the mounting plate is tapered from a central region to the surrounding periphery edge.

* * * * *